March 4, 1958 V. T. REYNOLDS 2,825,885

VIBRATION RECORD INTERPRETER

Filed June 14, 1954 8 Sheets-Sheet 1

Vining T. Reynolds
INVENTOR.

BY

G C Helmig
ATTORNEY

Fig. 2
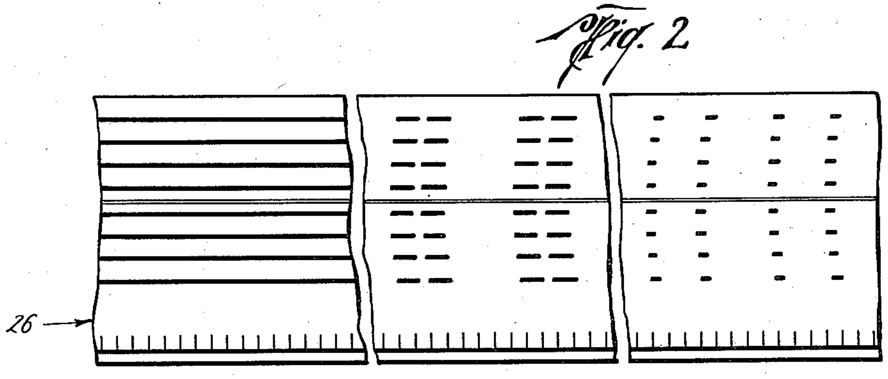
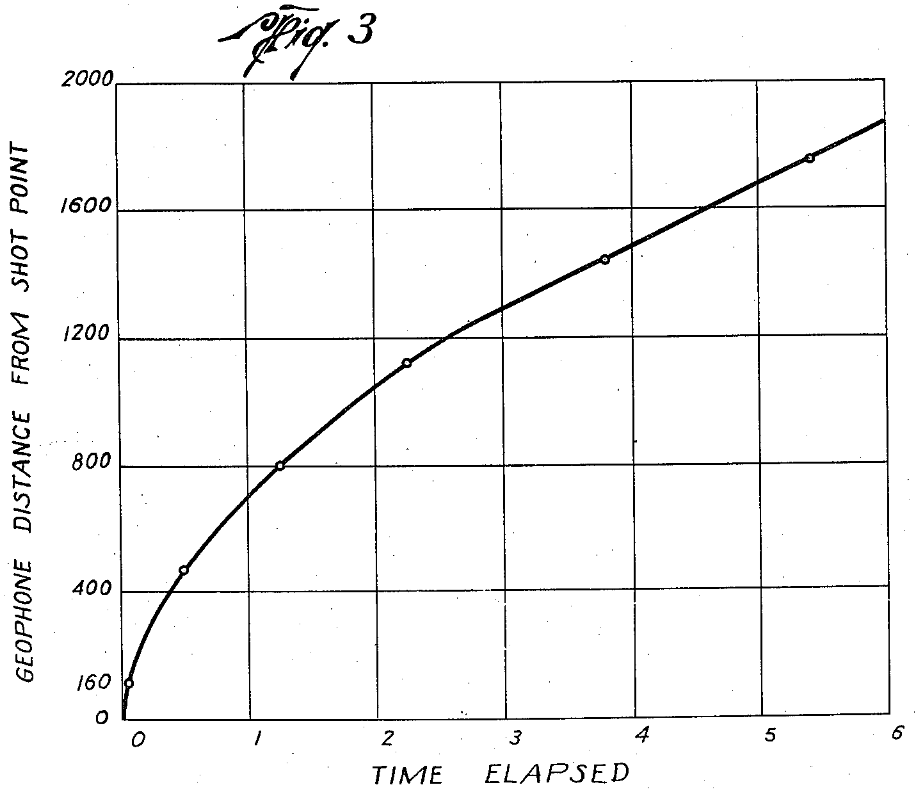
Vining T. Reynolds
INVENTOR.
BY
G C Helmig
ATTORNEY

Vining T. Reynolds
INVENTOR.

BY

G. C. Helmig
ATTORNEY

Vining T. Reynolds
INVENTOR.

BY G C Helmig

ATTORNEY

March 4, 1958 V. T. REYNOLDS 2,825,885

VIBRATION RECORD INTERPRETER

Filed June 14, 1954 8 Sheets-Sheet 5

Vining T. Reynolds
INVENTOR.

BY

G C Helmig
ATTORNEY

VIBRATION RECORD INTERPRETER

Filed June 14, 1954 8 Sheets-Sheet 6

Vining T. Reynolds
INVENTOR.

BY

G C Helmig
ATTORNEY

March 4, 1958 V. T. REYNOLDS 2,825,885

VIBRATION RECORD INTERPRETER

Filed June 14, 1954 8 Sheets-Sheet 7

Vining T. Reynolds
INVENTOR.

BY

G C Helmig
ATTORNEY

March 4, 1958 V. T. REYNOLDS 2,825,885

VIBRATION RECORD INTERPRETER

Filed June 14, 1954 8 Sheets-Sheet 8

Vining T. Reynolds
INVENTOR.

BY

G. C. Helmig
ATTORNEY 2,825,885

VIBRATION RECORD INTERPRETER

Vining T. Reynolds, Houston, Tex., assignor, by direct and mesne assignments, to Southwestern Industrial Electronics Company, a corporation of Delaware Application June 14, 1954, Serial No. 436,302

21 Claims. (Cl. 340—15)

Figure 1:
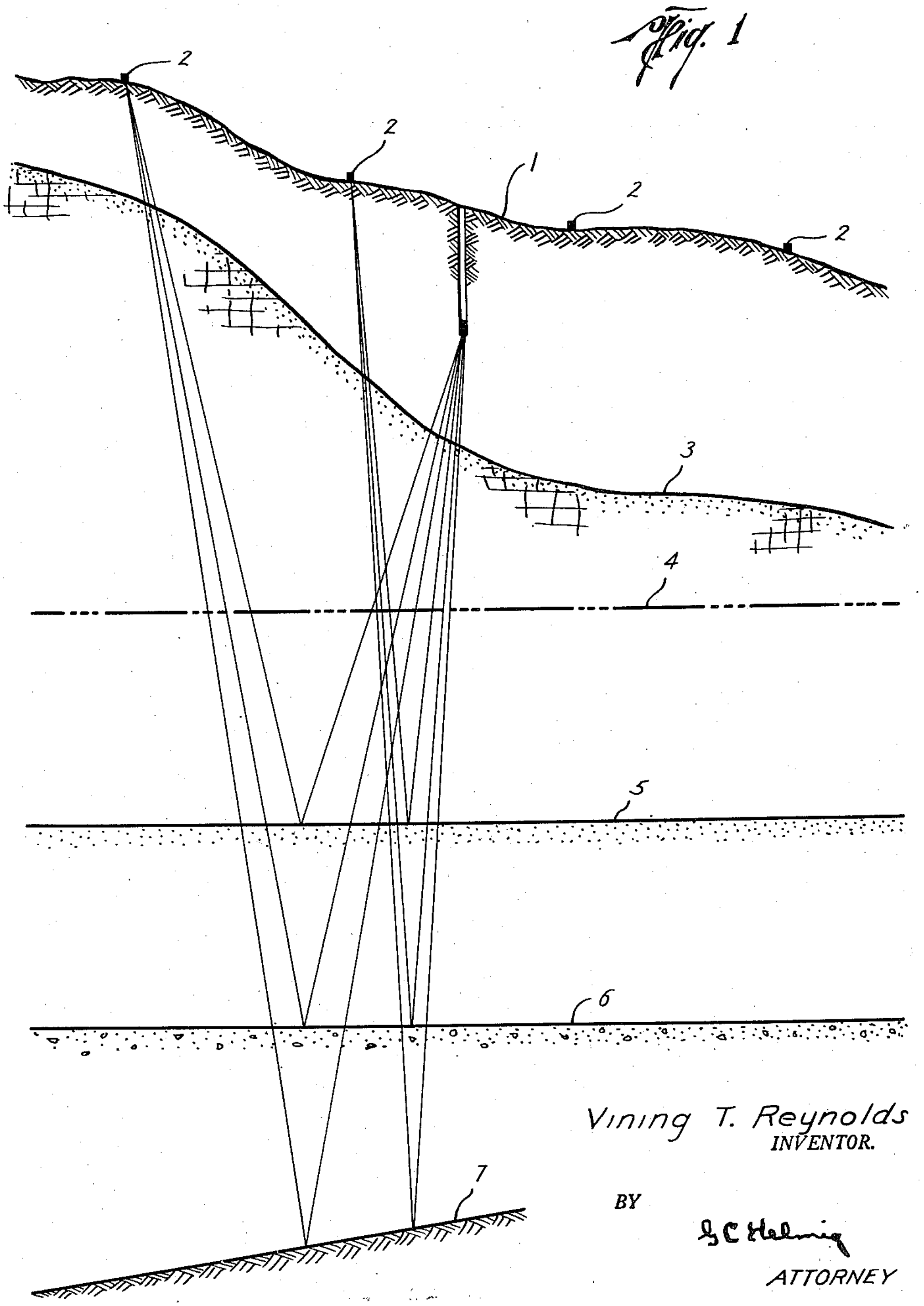

The invention relates to seismic exploration work, and more particularly to apparatus for interpreting the results obtained by recording at a series of spaced detectors the vibratory tremors from an explosive shot as reflected from successively deeper substrata. Records to be interpreted can be those produced by equipment disclosed in patent application Serial No. 394,323, filed November 25, 1953.

The well known type of seismograph equipment heretofore in general use, tape records in wave curve form the vibrations received by several geophones, and also marks uniform time intervals on the record tape. This record is then laboriously interpreted by skilled geophysicists who calculate the character, direction, and depth of earth formations by reference to vibration amplitudes, frequencies, and time positions shown on the tape. Such procedure is regularly practiced to detect and determine whether faults or formation irregularities are indicative or not of salt domes, oil pools, and the like, and their magnitude and depth location.

It is an object of the present invention to quickly provide at minimum cost an accurate record which can be easily read and thereby eliminate much of the need for specialized training and involved mathematical calculations with the attendant unreliability arising from human error.

Another object of the invention is to provide an interpreting machine which can be easily set or adjusted initially in compensation for known variables and which will mechanically reproduce a previously obtained seismograph record in corrected and simplified form, whose showing can be understood at a glance.

A further object of the invention is to provide for photographically reproducing a record by arranging a light-sensitive film to be traversed by a light beam projected through a master record containing side by side trace lines, representative, respectively, of vibrations in periodic time sequence as previously picked up at each of several spaced surface points by a series of geophones, and by interposing in the light beam path a bank of relatively correctively adjustable sights, one for each of the several geophone recorded images, for transmitting a beam pattern in modified image alignment form, with provision for shifting the respective sights to preset offset relation to one another in accordance with known variations in vertical distances of the several geophones from a selected datum line parallel to sea level and preferably below the earth's weather layer, and for further shifting the sights individually during projector travel across the record as the projector progressively scans from early to late arrivals and according to both horizontal spacing of the geophones and to a predetermined scale of increasing densities of the successively deeper formations or over-all velocities. The individual shifting of the sights progressively during projector travel compensates for varations in depth velocities and in distances traveled from the datum line to each successively deeper reflecting surface and back to the datum line in the respective paths from the shot point to the several spaced apart geophones.

A still further object of the invention is to mount the light-sensitive film for a short range of travel in timed parallel relation to projector travel but at a given differential rate. When the record is scanned from early to late arrivals, the rate of light-sensitive film travel is progressively changed in a relation predetermined according to the scale of changes in depth velocities, wherefore the occurrences which were recorded in increments of time on the master record are transposed to show on the reproduction as occurrences in increments of depth. The readings in terms of depth are more easily comprehended and render the diagram in truer proportion.

Figure 4:
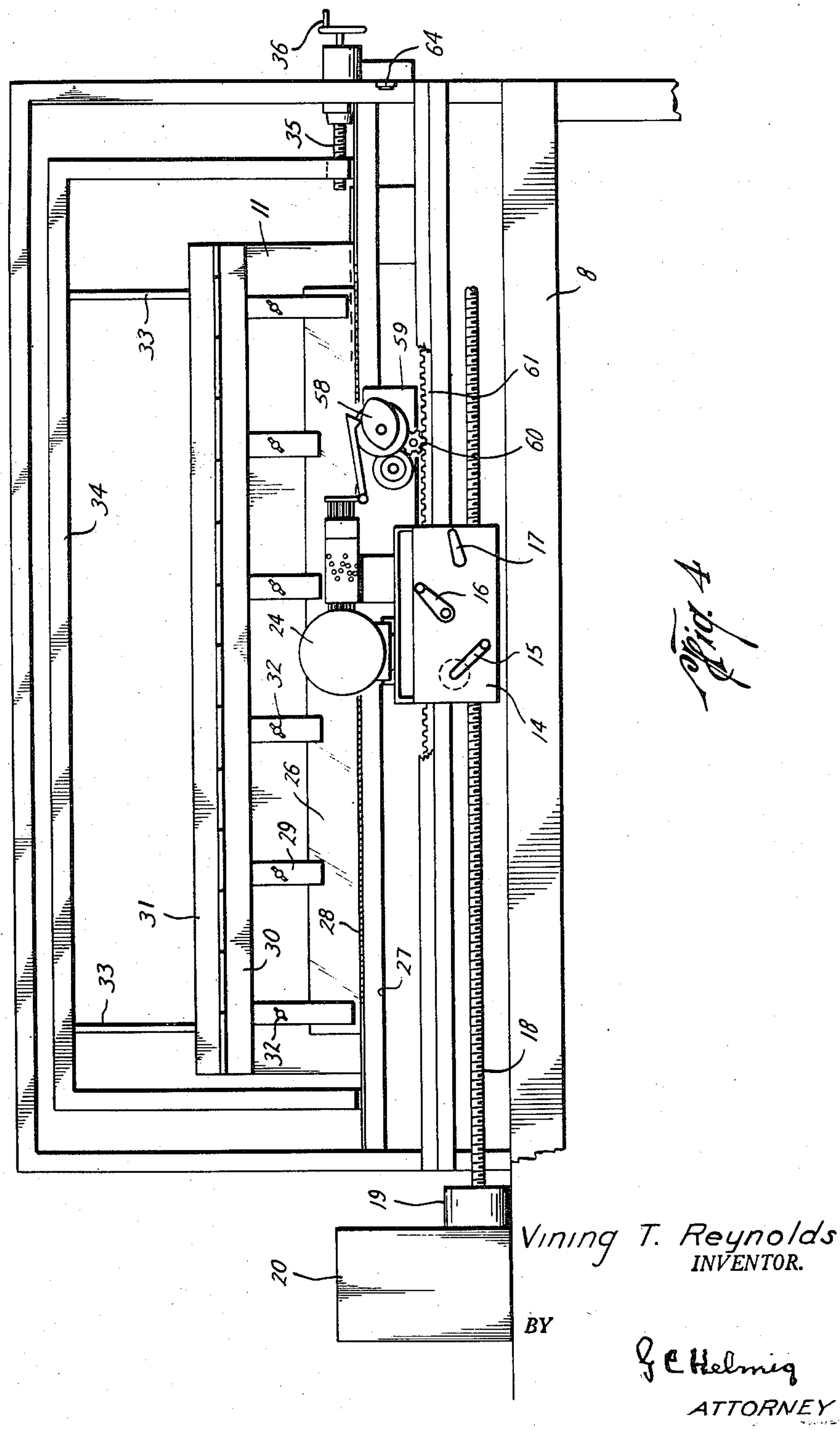
Figures 5, 5A:
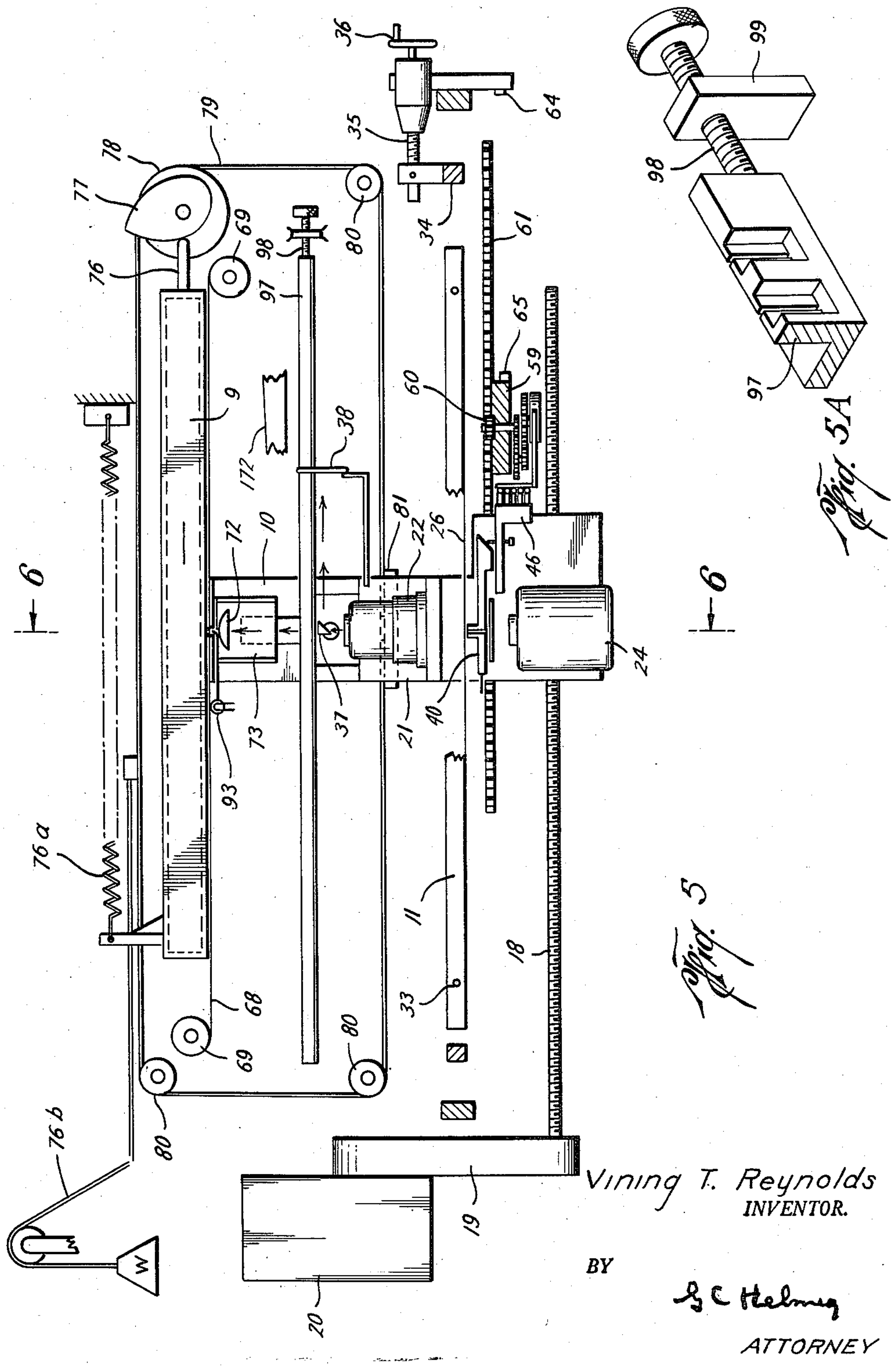
Figures 6, 7:
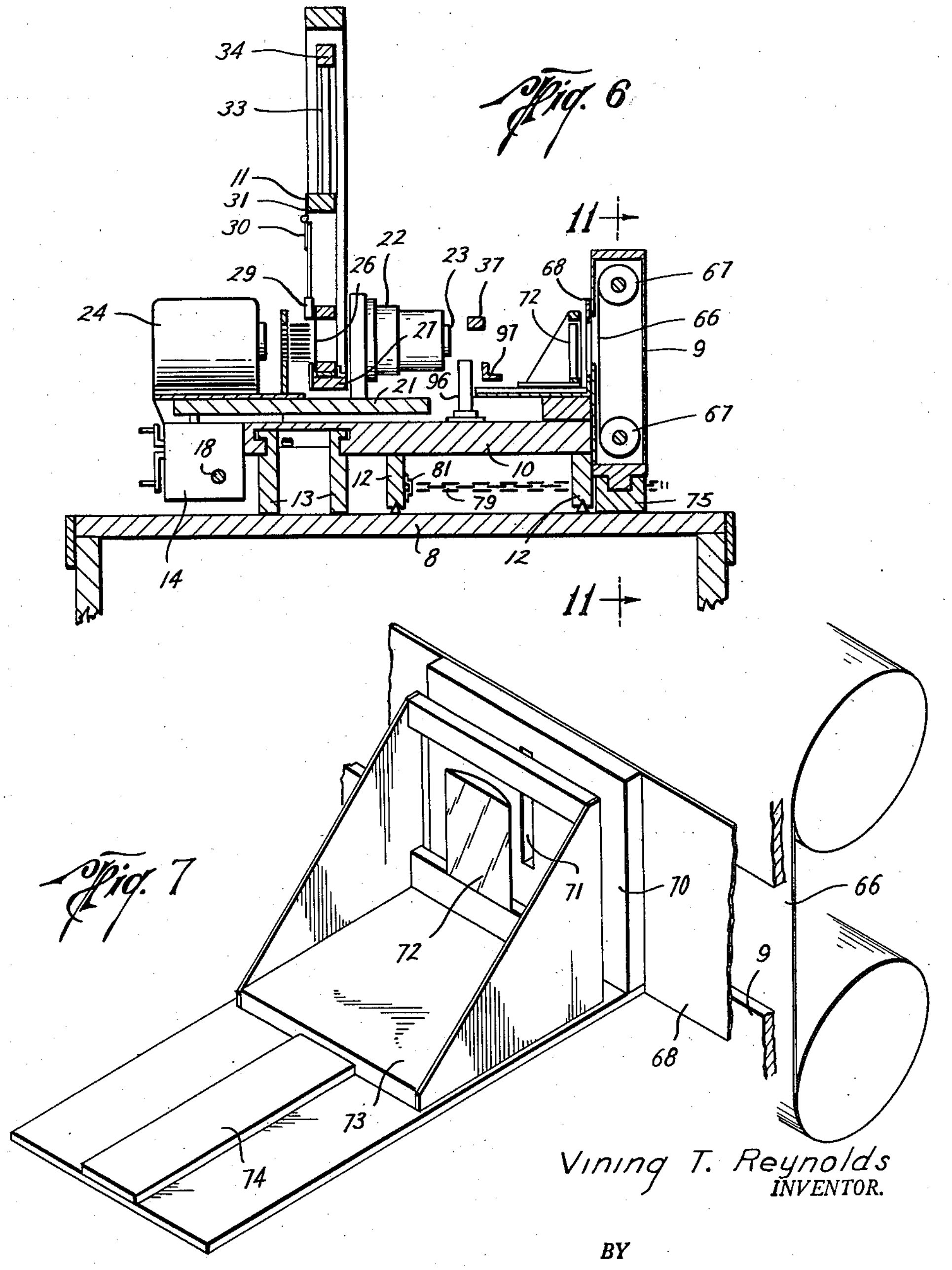
Figure 8:
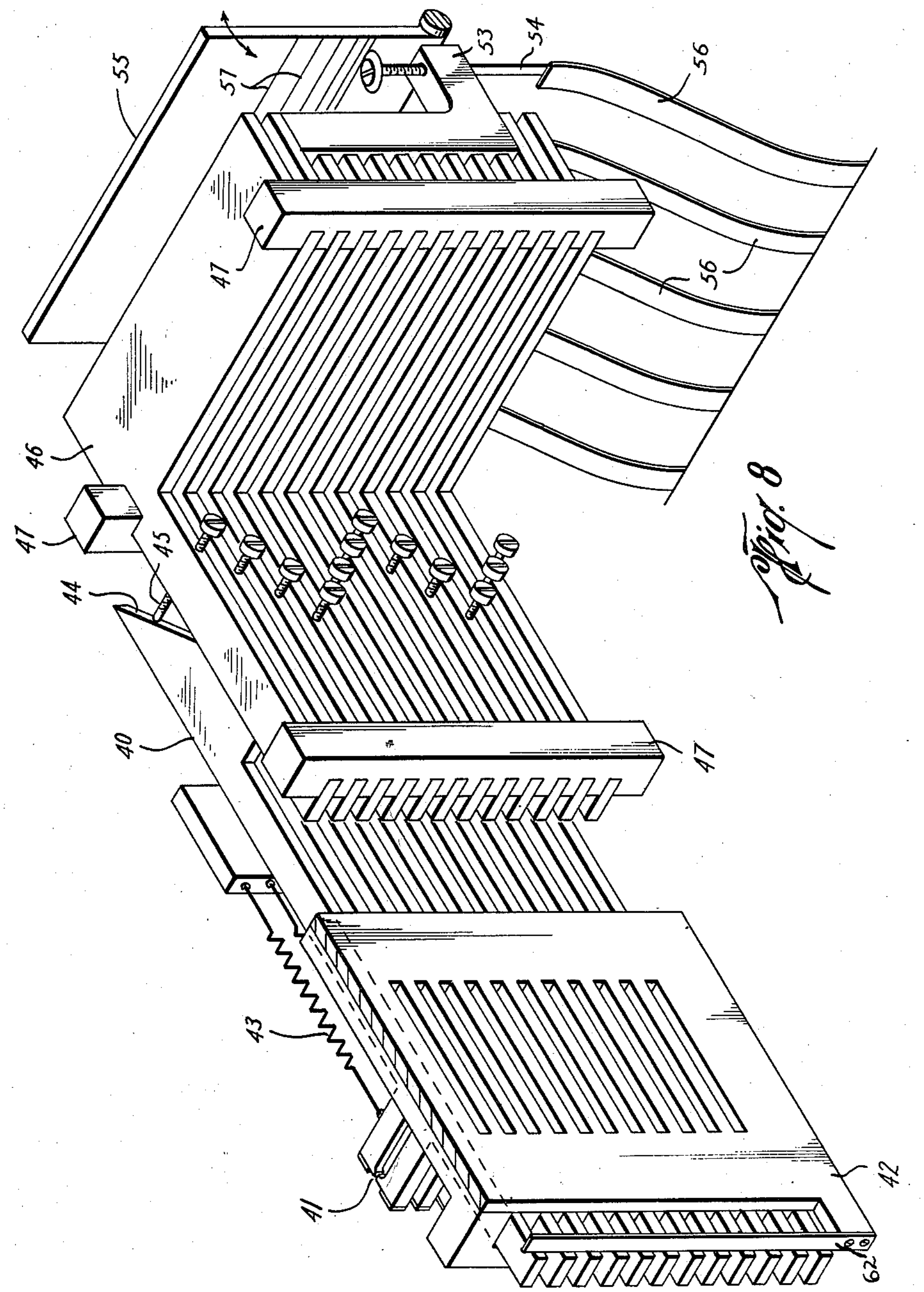
Figure 9:
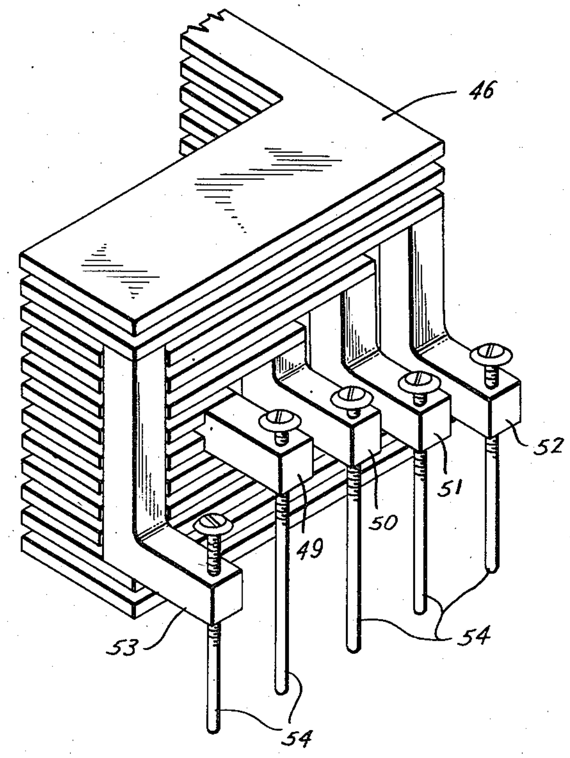
Figure 10:
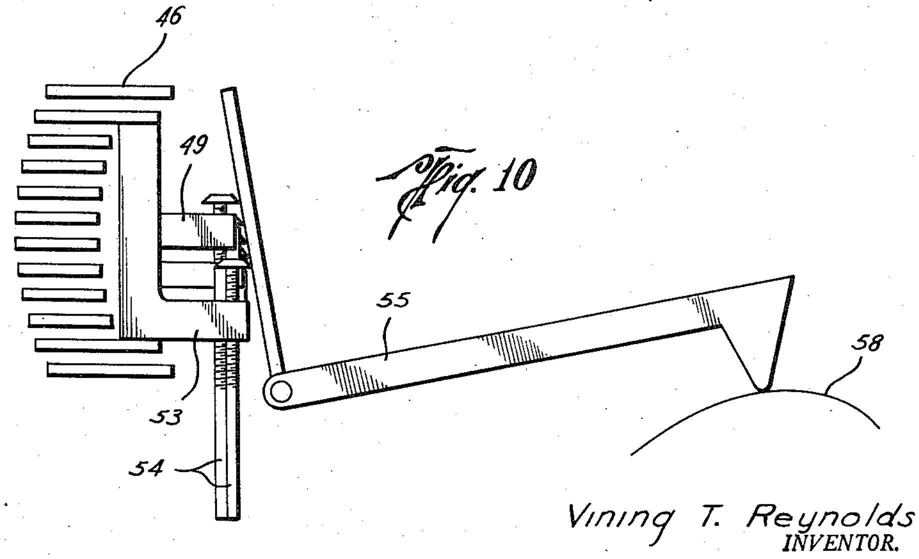
Figure 11:
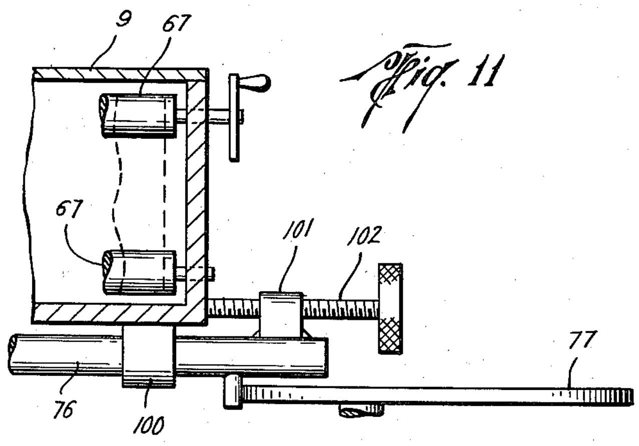
Figures 12, 13:
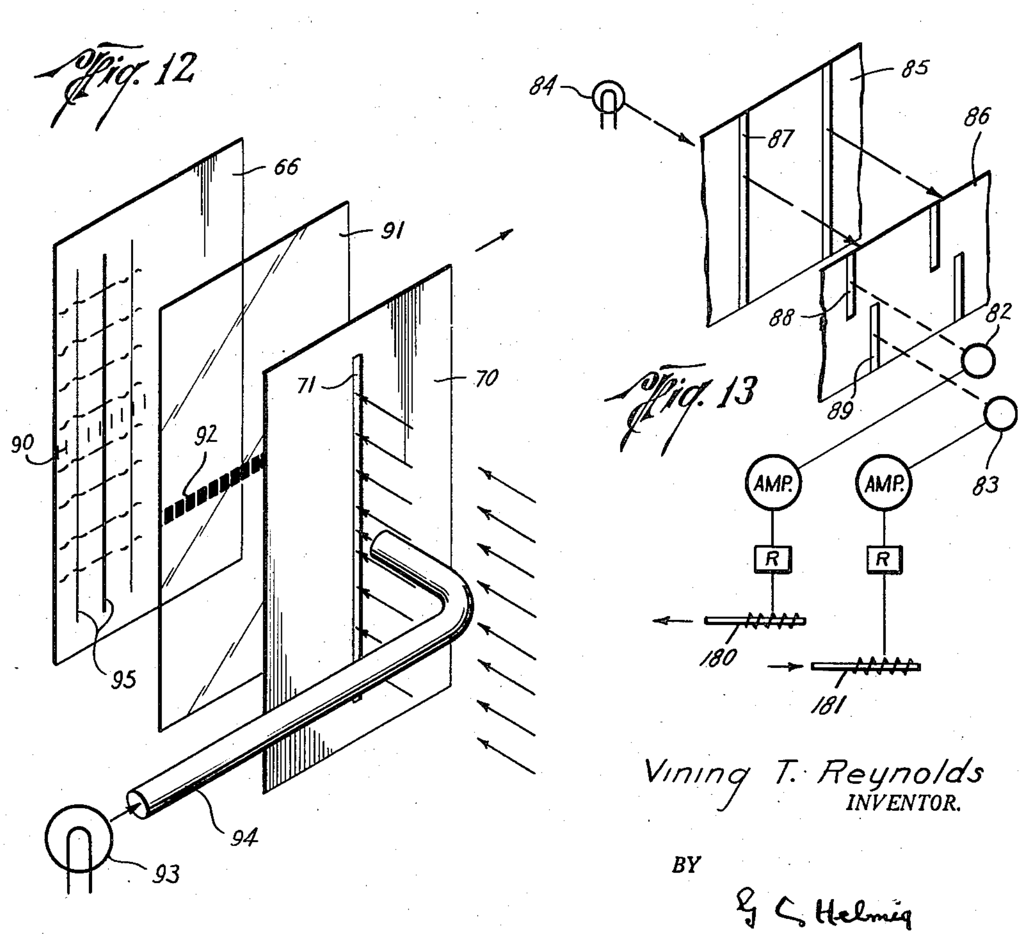

The foregoing objects and others as may appear hereinafter will be more readily understood from the following specification having reference to the accompanying drawings wherein Figure 1 is a vertical sectional view through the earth illustrating diagrammatically the use of reflection seismograph equipment; Fig. 2 is a plan view of fragments of a seismograph tape or master record showing markings to be reproduced in corrected form; Fig. 3 is a graph illustrating time lag at equally spaced geophones of a given tremor reflected from a surface substantially parallel to the datum line or sea level; Fig. 4 is a front elevation of the reproducing machine assembly; Fig. 5 is a top plan view with some parts broken away and shown in section, of the machine of Fig. 4; Fig. 5A shows an adjustment detail in perspective; Fig. 6 is a transverse vertical section taken on line 6—6 of Fig. 5; Fig. 7 is a detail perspective view of the parts at the light transmitting opening of the camera box with a light collecting lens in advance of the opening; Fig. 8 is a detail perspective view illustrating as a subassembly a bank of sighting devices and a position adjusting and shifting mechanism whereby relative sight adjustment is effected; Fig. 9 is a perspective view showing a fragment of the subassembly as viewed from the right of Fig. 8; Fig. 10 is an elevation on an enlarged scale of the sight operating mechanism for shifting the sights in relation to projector travel; Fig. 11 is an elevation of motion transmitting mechanism for the camera or film holder; Fig. 12 shows in perspective parts of the camera and an arrangement for marking depth; and Fig. 13 is a perspective view and a wiring diagram of a modified arrangement for an automatic adjustment should regular time intervals on the master tape become unequally spaced since their original recording.

Before describing the invention in detail, reference is first made to Fig. 1, which diagrams an exploratory operation using seismograph equipment. The surface 1 is illustrated as being of uneven contour, so that the several equally horizontally spaced detectors or geophones 2—2 are at different vertical heights. In level country the vertical displacement will be less pronounced. For some distance below the surface is the usual weather layer extending to the line 3, whose vertical depth varies with locality and which, because of its porosity, offers high resistance to vibration travel. Below the weather layer there occur more dense strata, and density usually increases with depth in a known uniform rate for different sections of the country. It is desirable to establish a reference plane or datum line usually below the looser weather layer, and which line is indicated at 4 in Fig. 1. Reflecting surfaces 5 and 6 between substrata are illustrated as being substantially parallel to the datum plane 4, and an angularly disposed reflecting surface is indicated at 7 and may be considered as a situation which might be encountered at any depth. It is such conditions, as recorded by reflections from a large number of successively deeper surfaces, which are to be interpreted from the exploratory work.

Midway of the centermost pair of geophones, an opening is drilled through the weather layer 3 to a selected depth, and a charge of dynamite is exploded in the shot hole. Tremors therefrom move in all directions, with spaced geophones picking up these tremors for oscillograph recordation. Those reflected from surfaces of changing layers can be co-related and recorded as side by side traces on the oscillograph tape to show planar direction, thickness, and nature of the layers between successive reflecting surfaces. With detectors spread in a field and at equal horizontal distances from one another, the reflections from a given depth will be recorded in side by side traces but in slightly longitudinally offset positions due to the time lag resulting from the different distances of the paths traveled from the shot point to the several spaced apart geophones. A few path lines are diagrammed in Fig. 1 for ease of comparison, and clearly show that the distance traveled from the shot point to the reflecting surface 5 and back to the surface will be greater as geophone distance from the shot point increases. A similar lag will occur with respect to images received at the several detectors from the parallel reflector surface 6, and also with reference to the vibrations reflected from the irregular or angularly disposed surface 7, although in the case of the latter reflections, the lag will be either a greater or a lesser lag than would be recorded from a surface in substantial parallelism with the datum plane. Study of variants enables determination of existing conditions.

An explanatory lag curve is shown in Fig. 3 which plots time against geophone distance from the shot point. The curve representation is for illustrative purposes only, and actual lag will vary with depth and velocity for each situation. The elapsed time ordinals may be considered as indicating small fractions of a second, and may be as small as ten thousandths of a second. Any number of geophones can be used, and their spacing apart may vary; and merely for illustration, the graph in Fig. 3 is shown as applicable to a spread or geophone field in which the several geophones are arranged in a straight line and at uniform distances of 320 feet apart with the shot point positioned so that it is midway between or 160 feet from the two centermost geophones. This graph will later be referred to in discussion of the adjustment of the sights in compensation for variable lag resulting from geophone spread.

Whereas the conventional seismograph camera photographically records detected vibrations in alternately deflected or wave line form and with varying amplitude deflections in closely adjacent lines often confusingly overlapping, the present invention deals with a master record strip made by a seismograph camera such as disclosed in application for United States patent Serial No. 394,323, filed November 25, 1953, and which records vibrations received from successive strata at several spaced apart detectors, by a series of substantially parallel distinctly non-overlapping lines containing gaps, whose lengths, as will be described, are representative of vibration amplitudes. Each trace may be considered as a wave line, whose crests are omitted, completely on one side of mean and partially on the other side.

Briefly, that camera utilizes a group of oscillographs, one for each detector, together with light excluding screens associated with each oscillograph in the path of its oscillating light pencil shaft or beam so as to blank off completely that half of the oscillating ray on one side of mean and to blank off partially the other half of the ray oscillation or that to the other side of mean, whereby the latter half oscillations of the light pencil beyond given amplitude have their crests cut off and are kept from the light-sensitive film. Because of a narrow band of film exposure area, only fragments of wavy lines are recorded, and these appear in such narrow band as to resemble a straight line. Line continuity is interrupted by beam oscillation beyond the screen passage, and the length of each interruption shows the degree of amplitude of a particular vibration. Reflections from depths of several thousand feet will occupy a record tape of a few feet in length, and line markings thereon may start from the left end of the tape and progress toward the right as time increases from the instant of detonation and as reflections come from increasingly greater depth. After exposure in the seismograph camera, the film is developed and fixed, and either it or a paper print from it affords the master record to be referred to herein.

An example of a master record is shown in fragmentary fashion in Fig. 2. The equally spaced, short vertical lines along the bottom edge of the tape mark like time intervals in equal increments. They are printed by a light beam which flicks on the film through a timing shutter controlled by an electrically driven tuning fork. Their location on the record bears no given relation to the instant of shot, which is to say there is no coincidence on different tapes for repeat tests, of time scale markings in relation to reflection arrivals. They are useful as a control guide during a tape traversing reproduction operation for any necessary adjustment lengthwise of the master tape at any scanning instant, so as to present to the scanner the recorded images in true time receipt order. Merely for reference purposes, the continuous, longitudinally extending central line is included in Fig. 2 as the central location of the shot point. The eight parallel lines, i. e., four on each side of the shot reference line, show the vibrations picked up at each of eight spaced geophones or detector stations arranged in a field as illustrated in Fig. 1. In the fragment on the left-hand side of Fig. 2, the several tracer lines are all unbroken and indicate a lack of vibration; or, in other words, each oscillograph is stationarily centered. The central and right-hand fragments indicate vibrations by reason of breaks or gaps in the line. In each instance the alternate wide gaps indicate a complete blanking out of half of the entire wave, and the intermediate gaps indicate by their length the range of vibrations, those in the center fragment being of shorter amplitude than those in the right-hand fragment. Frequency of vibration is indicated by distances between either starting points or ending points between successive fully blanked out halves of the waves. In this record it is to be noted that as the trace lines are farther spaced outwardly on each side of the shot point reference line, the images in each vertical group are offset longitudinally in succession, as would be expected due to the lag (see Fig. 3) in receipt of reflection at detectors more remote from the shot point. This is the master record to be reproduced in corrected form, and when corrected the expected lag showing will be eliminated as to those substrata reflecting surfaces which are parallel to the datum plane or free of faults and significant inclination or other irregularities. Pronounced misalignments in the final reproduction will stand out for immediate recognition of a fault, and the depth, direction, and nature of the formation can readily be ascertained.

For reproducing the master record in corrected form, use will be made of a scanning machine substantially as shown in the remaining figures of the drawings. This machine includes a bed or table 8 on which are separately shiftably mounted in spaced parallelism a signal receiving recorder or light-sensitive film holder 9, a traveling carriage 10 for a signal sending or light projector, and a holder 11 for the record or master tape through which a reproductive signal such as a light beam is to be projected to a receiver such as the film in the camera 9.

The carriage 10, as best seen in Fig. 6, has a pair of dependent supporting legs 12—12, longitudinally slidably engaged with tapered guides or tracks on top of the table 8. The carriage also has sliding keyed engagement with a pair of table uprights or rails 13, and mounts in front of the rails 13 a control box 14 from which project operating crank handles or levers 15, 16, and 17. The lever 17 controls a releasable clutch or dog by which the carriage is detachably drive coupled to a rotating feed screw 18 whose left-hand end, as seen in Figs. 4 and 5, is drive connected through a reduction gear box 19 with a constant speed electric motor 20. Preferably, carriage travel during a scanning operation will be from left to right, or in the direction of elapsed timed occurrences shown on the master record. Operation of the lever 17 to disconnect the screw drive coupling will enable manual shifting of the carriage conveniently by the hand lever or crank 15 which rotates a gear in mesh with the drive screw 18. Usually, manual carriage shift will be effected with the motor and drive screw rotation stopped. The hand crank 16 is arranged to turn a screw shaft associated with a traveling nut for transversely adjusting a carriage supported slide plate 21 on which is mounted, behind the record holder 11, a rearwardly disposed tubular support 22 containing a focusing lens 23 in alignment with the light beam projected from a light source housed within a box 24 positioned in front of the record holder and fixedly mounted on the traveling carriage. Proper light focusing results from turning the hand crank 16.

In the space between the light projector 24 and the lens support 22 is the adjustable holder 11 for the transparent master record strip 26 to be interpreted. The holder includes three superposed vertically spaced and end connected bars, the lower one being slidably guided on a support rail 27 fixed at opposite ends to the bed 8 to bridge the traveling carriage. Projecting upwardly at opposite edges of the stationary rail 27 are guide flanges (see Fig. 6) defining a track channel for the slide frame or master tape holder 11, and the foremost of these flanges is a fixed scale ribbon and has on it a series of equally spaced time interval marks or slits 28 (see Fig. 4) for correspondance alignment therewith of time interval marks along the bottom edge of the strip or tape record 26, as seen in Fig. 2. This edge scale on the master tape 26 can be fitted edge to edge with the fixed scale markings 28, and the latter can be either light passing slits on an opaque ribbon or opaque graduations on a transparent ribbon. The master tape 26 is clamped in position by the series of dependent straps 29 which extend downwardly from a hinge strap 30 whose pintle pivotally connects it to the strap 31 fixed to the holder frame 11. Wing nuts 32 secure the hinged straps in clamping relation with the tape record, and detachment of the nuts 32 allows the hinged clamps to be swung upwardly for removal and replacement of a tape record. The holder 11 is slidable vertically on a pair of guide rods 33 on an inverted U-shaped frame 34 having end bearing on the slide support rail 27, and this vertical adjustment will enable the holder to be lifted above and out of interference with other parts, to facilitate insertion and removal of the master tape 26.

At the right-hand end of the frame 34 as viewed in Fig. 4, its dependent leg is threadedly engaged by a rotatable stud 35 mounted on the stationary part of the bed 8 and provided with a hand wheel 36 by which the entire holder assembly can be shifted within a short range to the right or to the left for time interval alignment purposes. That is to say, the time scale marks on the edge of the master tape clamped in the shiftable holder 11 are to be aligned with the interval marking slits of the fixed bar 27, and convenient hand wheel adjustment eliminates awkward handling while the long narrow strip is being positioned in its clamping holder. Such movement may also be effected as the scanning operation proceeds to correct for uneven expansion or shrinkage in portions of the tape and which may have occurred during photographic development of the tape record 26 or with temperature and humidity changes. Such distortion will affect uniformity of interval markings but can be remedied by hand wheel adjustment of marking alignment. For visual checking an alignment of the time markings on the tape 26 with the time markings 28 adjacent the path of projected light through the record, there is employed, as shown in Fig. 5, a translucent viewing screen 38 and a co-operating prism 37 on the traveling carriage. The prism is in the path of a portion of the projected light which passes through the time interval marks, both those on the master tape and those indicated at 28 on the stationary flange. This portion of the beam preferably passes through a small color lens and is deflected by the prism to the viewing screen 38. The color should be one to which the photographic film is insensitive, to avoid time marking reproduction, and it will aid definition on the screen viewer. Placement of the viewer to face the operator at the right-hand end enables ready observation of marker alignment to be continuously maintained through hand wheel adjustment of the master tape holder 11.

The adjustment operation just referred to can be made automatic by declutching the shiftable frame 34 from the hand operated screw 35 and substituting a motor control such as illustrated in Fig. 13. The shiftable frame or master tape holder will then be moved to the right or to the left by energization of motor solenoids 180 and 181, respectively, as determined by misalignment detection through a photocell arrangement. In the simplified diagram the shiftable frame 11 is to be considered as fixed to the solenoid plungers, and solenoid response is through the usual relay and amplifier hookup, with electric eyes or light signal receivers 82 and 83 mounted on the traveling carriage to receive light from the main projector 24 or optionally from a separate light bulb 84, which can be independently switched on and off. A pair of co-operating stationary screens or masks 85 and 86 fixedly positioned in tandem relation are interposed between the light and the photocells and carry light transmitting slits for co-operation with opaque time interval marks on the master record. The slits 87 in the mask 85 are in spaced parallelism and on equal distance centers as determined by accurate time interval marks on the master record. Two groups or rows of similarly spaced slits 88 and 89 are carried by the mask 86, one row above the other, and the slits of the two groups are arranged so that each slit in one row is adjacent or slightly offset longitudinally to a neighboring slit in the other row and the slits of each neighboring pair are longitudinally offset one to one side and the other to the other side of exact center alignment with a slit 87 of the companion mask 85. Positioning of the photocells 82 and 83 with reference to the co-operating slits of each set and the light source will be such that during carriage traverse as the cell 82 and light source 84 pass into alignment with any set of slits 88 and 87, the beam, in the absence of interception, will trigger the cell 82 to actuate the solenoid 180, and at the same time the cell 83 will be lined up with the light 84 through the slits 89 and 87 to trigger the cell 83, provided there is no interference to light passage.

Interference for blanking off light passage to both cells will be afforded by positioning the shiftably mounted master tape 26 so that the time marks along its lower edge overlie the slits 87. If there has been no longitudinal shrinkage or expansion of the master tape, then its spaced time marks will overlie and blank off all the correspondingly spaced slits 87. In practice, a slight distortion can be expected at any region of the master tape. If it be assumed that a shrinkage exists between succeeding time marks in the region being scanned, then the slit 87 along its left edge, as viewed in Fig. 13, will be uncovered and light will pass through the slit 88 to the cell 82, and cause the solenoid 180 to project the master tape toward the left for bringing the time marking into covering relation with the slit. On the other hand, an expansion of the tape at the point under scanning would uncover the right-hand edge of the instant control slit 87 and light will reach through the slit 89 to the cell 83 to actuate the solenoid 181 and to retract the master tape position until the time graduation mark completes closure of the slit. Automatic adjustment will occur for needed correction as the light 84 successively traverses each slit 87, and thus vibration images to be reproduced are continuously presented for scanning in proper time spaced sequence without operator attention.

Interposed between the master record 26 and the projector 24 and supported for travel with the carriage, are a series of screens for confining projected light to corrected relative zones. As best shown in Fig. 8, the screens include a bank of slide plates or bars 40, one for each tracer line to be reproduced and each provided with a restricted light passage or sight 41. These sight bars are slidably mounted in spaced apart locator slots in a support 42 fixed on the carriage and formed with light passage slits aligned with the sights 41. Each bar 40 is connected to a biasing coil spring 43 which urges the slide bar toward the right, as viewed in Fig. 8. Each slide bar terminates at its right-hand end in an inclined surface 44 for engagement by an adjustable set screw 45. Adjustment of the set screw 45, by reason of its engagement with the inclined or camming surface 44, will shift the longitudinal position of the slide 40 against the spring 43 and vary the position of the sight 41 for an initial setting dictated by geophone relation to a datum line, as will be later explained. The several set screws 45 are in turn carried by slide plates 46 mounted in slotted posts 47 which extend upwardly from the traveling carriage 10. It will be noted in Fig. 8 that the normal position of the several set screws follows a generally zigzag line, and this is merely for convenience of adjustment because of limited working space available. Accordingly, the several slides 40 of the bank will be made of different lengths or distances between the sights 41 and cams 44, to fit the offset locations of the set screws 45.

The slide plates 46 are connected in pairs, as best seen in Fig. 9. Thus the two centermost plates are connected to a projecting lug 49, and these plates control the centermost sights, which are to be aligned with the tape images resulting from the actuation of geophone detectors closest to and on opposite sides at equal horizontal distances from the shot point. The next two successive plates are joined to the lug 50, and succeeding pairs are joined by the lugs 51, 52, and 53, respectively. The sliders are joined in pairs because those of each pair regulate sights on traces which were recorded at equal horizontal distances from the shot point. No operative connection is shown for the uppermost and lowermost plates. The number of plates in the bank can be increased or decreased, but for universal usage the scanning machine may incorporate enough slide plates to handle more than the average number of traces usually recorded and those slides not needed at any time can be left inactive.

Each lug carries an adjustable set screw 54—54. The heads of these set screws 54 are arranged to engage with one leg of a bell crank lever 55, and their relative adjustment in and out with respect to the axis or fulcrum of the bell crank lever will permit a variation in the mechanical advantage in the transmission of motion from the bell crank lever to the slides. Predetermination of lever arm length is according to geophone spread. Spring leaves or strips 56 are provided for engagement with each set screw to maintain it in engagement with the bell crank lever at all times. If desired, gauge marks or grooves 57 can be provided on the thrust face of the lever 55 to assist in proper positioning of the heads of the set screws 54. When the gauge marks 57 are so employed, they will be spaced apart in proportion to the indications on the graph of Fig. 3 provided the geophone distances apart were 320 feet. If other than the customary geophone spacings are used for a given test, the spacing of the markings 57 would need to be modified accordingly.

The other arm of the bell crank lever 55 is arranged to follow the profile of a cam 58 whose shape in relation to the range of carriage travel is developed or predetermined according to known velocities for different depths from which reflections are received. This cam, as best seen in Fig. 4, is rotatably mounted on an extension plate 59 fixed to the traveling carriage 10. It is driven through a gear reduction train terminating in a pinion 60 which rides on a longitudinally extending toothed rack 61 fixed to the bed of the machine. Thus movement of the traveling carriage at a constant rate is transmitted to rotate the cam 58 and shift the slide plates in the plane of carriage travel, at a rate proportional to changing depth velocities as the scanning proceeds, so that changing positions of the sights for the light beam will cause the images to reach the light-sensitive screen in condition corrected for variations in velocities as the depth increases. Likewise, compensation is made for the variations in horizontal spread by imparting proper relative travel to the plate sights through the mechanical leverage changes afforded by adjustment setup of the setscrews 54. Preliminary adjustment of the set screws 45 will set up the relative positions of the sights in relation to vertical variations of the detectors with reference to the preselected datum line.

With such corrections the gaps of each vertical group in neighboring lines of the master record will tend to be transformed on the light-sensitive film into vertical alignment as distinguished from the lag resulting offset relationships illustrated in Fig. 2. Regular gap alignment will occur so long as the particular reflection surface indicated by any set of gaps is in a plane substantially parallel with the datum line. Out of alignment will indicate a surface out of parallel with the datum line and a strata disturbance such as a fault. Therefore, major faults indicative of an oil pool can be easily read from the developed film or prints therefrom by noting misalignment tendencies and the extent of misalignment at any point.

For initially setting up the machine prior to the reproduction of the record, an arrangement is provided for observation of the positioning of the several sights as controlled by the adjustable setscrews 45. A convenient structure for that purpose is shown in Fig. 8 as illustrative. A sight or straight edge in the form of a vertical narrow strip 62 is fixed to the screen 42 for co-operation with gauge indicia on end extensions of the slide plates 40. Measurement data on geophone distance from the datum line will govern setting of the setscrews 45 as read on gauge scale marks of each slide at the straight edge 62. Optionally, gauge markings can be placed on a scale fixed to the screen 42 for co-operation with an adjacent sight marker on each slide 40.

A manually actuated control switch for the drive motor 20 will start and stop carriage travel. As a safety factor to insure machine shutdown automatically at the end of the reproduction operation, a limit switch 64 (see Fig. 5) is mounted on the right hand of the main frame of the machine, to be engaged by a suitable finger 65 on the carriage for cutting off the feed of current to the electric driving motor 20 when the carriage reaches the end of its travel range.

Referring now to the light-sensitive film 66 enclosed within the light excluding box 9, the proposal is that this film be mounted at opposite ends on winding and unwinding rolls 67—67, which will enable successive portions of the film to be exposed upon repeated operation of the machine. A suitable hand knob connected to the winding roll can be used to shift the film after each exposure. The front wall of the box contains a longitudinal slot of a length corresponding to the range of carriage travel. This slot is closed or sealed by a traveling mask 68, as best seen in Fig. 5, and its opposite ends are wrapped upon spring-wound drums 69—69 for paying out and winding up the mask during its travel. Its central portion is secured to a vertical plate 70 (see Fig. 7) which moves with the traveling carriage and contains a light passage 71 aligned with an opening through the mask 68 and which therefore constitutes the only light transmitting opening to the interior of the film box 9. Immediately in advance of the camera opening 71 is a light collecting lens 72 which gathers and focuses projector light rays through the narrow vertical slit 71. This lens 72 is conveniently mounted on a slide plate 73 whose underside is slotted for tracking on a guide rail 74 whereby the lens may be adjusted toward and from the light-sensitive film 66.

It will be noted in Fig. 6 that the bottom wall of the box 9 has a projecting rib which is slidably guided in a longitudinal groove in the supporting bar 75 forming a part of the machine bed or table 8. In Fig. 5 it will be seen that the box assembly is connected to biasing spring 76ᵃ and has a cam follower extension or arm 76 at one end to engage with a rotary cam 77. This cam is geared or otherwise drive connected with a sprocket or pulley 78 driven by a belt or chain 79 which passes around a circuit of spaced idlers 80—80 and is fixed to the traveling carriage at 81. Consequently, travel of the carriage serves to rotate the cam 77, which in turn shifts the film carrying box or camera 9. The chain 79 may have connected to it a counterweight cable 76ᵇ. The direction, range and rate of movement of the film box relative to carriage travel is controlled by the profile of the cam 77, which is laid out in relation to variations in velocities as depth increases from which successive reflections were recorded. Inasmuch as densities increase with depth, the velocities increase at an accelerated rate, and by proper contour of the cam with reference to such changing conditions, the camera box movement compensates for the increase with the result that the length scale of the final record will be proportional to depth. Whereas increments of master record length are increments of time, the length increments on the corrected reproduction are increments of depth. For the maintenance of a standard over-all tape length, the cam shape has been evolved to give camera film a movement initially in the same direction as that of the carriage during its light scanning of the stationary master, and at a rate progressively decreasing to zero and then gradually increasing in reverse direction in the final range. Since the desired result is a function of differential relative travel of the light, the master tape being scanned, and the camera film, it follows that other provision can be followed to effect their relative differential travel. With relative travel as described, the time sequentially spaced traces being scanned are reproduced in closer order at the start and stretched out at the end, time significance being minimized in favor of depth significance.

By reason of this differential travel, the projected light beam travels more slowly across or is impressed longer on the film at the start than at the end of the range. To compensate for the progressive lessening of time exposure, the lens 72, through tracking engagement of its carrier 73 with an inclined rail 172, a fragment of which is shown in Fig. 5, is caused to slide closer toward the film, as an incident to carriage travel, for an increased concentration of the projected light by a better focusing on the film surface.

In order to mark equal depth increments on the corrected final record, the arrangement of Fig. 12 has been devised. This illustrates some of corrected traces on a fragment of the film 66 in the process of being exposed to the light pattern indicated by a group of arrows passing through the camera slit 71. Also illustrated on the film fragment 66 in a preferred central zone, is a group 90 of equally spaced short vertical lines as a depth scale. Overlying the film 66 and fixed as a part of the film holder 9, is a sheet 91 of transparent material to pass the trace forming light, but having a central line 92 of opaque blanks or dashes with clearances therebetween at regular predetermined distances for successively screening and passing a light beam to record the depth marks 90. For supplying the light, a lamp bulb 93 is mounted for travel with the carriage and out of line with the pattern coming from the projector 24. Light from the lamp 93 is fed through a conduit in the form of a thin rod 94 of Lucite or other material capable of conducting light in a bent path. The rod 94 extends from one end adjacent the offset lamp 93 and has its opposite end bent into alignment with the camera slit 71 so as to project the light toward the masking blanks 92 and intervening openings.

In the already exposed portion of the film 66 of Fig. 12, there are shown a few spaced vertical lines 95 extending across the several traces. These are time interval marks appearing throughout the length of the tape to aid reading. If desired, every tenth vertical line can be heavier than the others when divisions are in tenths of a given time unit. They will not be equally spaced apart as were the time intervals on the lower edge of the master record, but their spacing will progressively increase, since relative velocity increases with depth and the length of the final record is presented in equal depth increments requiring time markings to be successively stretched out. For projecting time lines to the light-sensitive film, use is made of a light bulb shielded within a container 96 (see Fig. 6) mounted on the traveling carriage 10 with a light passage directed toward the film 66. A screening strip 97 is traversed by light from the container 95 and is mounted on the fixed table of the machine. It carries a series of saw cuts or light passages (see Fig. 5A), and these are spaced apart distances predetermined for time intervals in relation to the increasing depth velocity scale. Light permitted to travel through the spaced screen passages marks the time lines 95 on the film 66 during carriage traverse.

It is customary to make several tests of an area under exploration and then place the record tapes beside one another for comparisons. With the present equipment, the successive master test records may be reproduced by exposures in succession, one below the other on the same film. After each exposure, the film 66 is wound on the receiving spool 67 to bring a new film portion into position for exposure. Comparison of several tests on the same record will be facilitated if the time lines 95 on each exposure line up vertically. This dictates that the screen 97, as well as the film holder 9, be relatively shiftable for an initial setup before each exposure. The screen 97 has an indexing screw jack 98 shown in Fig. 5 as threadably mounted in a fixed lug 99 and as having a hand knob at one end and a connection at the other end with the adjacent end of the screen 97. This allows longitudinal shift of the screen and the light slits to be set up before each reproduction operation in relation with the markings on the master record and computations of data on the particular test conditions, such as the relation of shot instant to reflection arrivals.

Uneven windup of the film 66 and a resulting longitudinal displacement may occur, and the projection of a colored or dark light through perforations at the edge of the film to a gauge screen on the mask 68 will enable readjustment of the film holder to properly position the starting point for time markings 95 on the film 66. Such initial adjustment involves a slidable mounting of the cam follower 76 in a guide bracket 100 (see Fig. 11) on the camera box 9 and a lug 101 carried by the follower 76 and provided with screw threads to receive an adjusting screw 102 whose inner end bears on the slidable camera box. Rotation of the screw 102 expands or contracts the effective length of the cam follower to preset the starting relation. Suitable scales may be associated with both adjusting screws 98 and 102 for use during their advance and back off.

While the support bar 27 carrying the time registration marks 28 has been referred to as fixed to the bed of the machine, it may be arranged for a slight shifting of the timescale. This would help in positioning the time marker in relation to the datum reference plane location on each record tape to be reproduced.

The special seismograph camera which responds to geophones in making the master record has been described as having screens each to blank off all but a small portion of the total range of each oscillating light beam and thereby record light in only a small zone of the range of beam swing. That zone of light passage has been placed at and to one side of mean, but it could be placed otherwise; its size could be varied and more than a single passage could be employed. For example, the light excluding screen in the path of the oscillating ray may have a central passage and one or more small passages on either or both sides and in predetermined spaced relation to mean. There would then be recorded spaced successive portions of each oscillation whose amplitude brings it into the zone of given screen passages. To avoid overlap on the record of adjacent traces and to keep the trace bands of small width, a lens arrangement can be provided, such as one wherein the light from all the screen passage zones is collected by a condensing lens, whose focal point is slightly behind the surface of the light-sensitive film, so as to record light oscillation in wave pattern of reduced height and broken line continuity. It will afford better delineation, as may be preferred for some purposes.

From the above description it will be seen that a seismograph record can be placed in the machine and quickly and easily reproduced in a form which can be directly read without the long-drawn-out and tedious calculations as heretofore have been necessary. The length of the final reproduction will be proportional to test penetration depth. It carries proper depth and time markings, and the amplitude and frequency trace indications are presented with compensation for lag of reception resulting from spaced geophone location for an easier detection of inclination, thickness and density of succeeding strata formation, and in particular of significant underground irregularities.

When an exploration has been completed by a series of tests in adjoining sections and the successive test records in final form are set in side by side order, the presentation of similar markings from each successive reflection surface stand out for easy comprehension of the characteristics of the subsurface formations.

While only a preferred embodiment of the invention has been specifically described, it will be understood that various modifications may be made without departing from the scope of the invention as set out in the following claims.

What is claimed is:

1. In a scanning machine for photographically reproducing in compensatory form, a seismograph master record showing by a series of spaced lines the detection of tremor reflections at each of a series of spaced earth surface stations, means to mount in spaced parallelism with one another, the master record to be scanned and a light-sensitive film to receive light projected through the record, a traveling carriage having drive mechanism to impart travel to the carriage in parallel with a mounted record, a light projector carried by the carriage and directed to pass a light beam through the record to the light-sensitive film, a bank of light screens separately adjustably mounted on the traveling carriage in the path of the projected light beam, there being one screen for each recorded line and each screen having a light confining passage therethrough for linear alignment with a line to be scanned, variable leverage motion transmitting mechanism operatively related in common to all of said screens and connected with the traveling carriage for varying the effective leverage of the mechanism in response to variations in carriage travel position and thereby shift said screens in accord with a predetermined pattern of depth velocity and a series of motion modifying levers, one for each screen, said levers being interposed between the screens and said mechanism and being individually adjustable in leverage length relative to one another as determined by and in compensation for the spread of the detectors.

2. The machine as described in claim 1 wherein said screen shifting mechanism includes an oscillatory member which is drive connected with said screens and is movable in response to changes in carriage position.

3. The machine as described in claim 2 wherein the motion modifying levers include relatively adjustable lever abutments for the respective screens having predetermined varied leverage relation with the lever fulcrum for relatively modifying the shift range of the screens in accordance with differences in relative horizontal detector spacing.

4. The machine as described in claim 2 wherein a follower lever is engaged with said member to transmit motion to the screens and wherein there is an adjustable lever abutment for each screen for giving each screen a predetermined lever arm advantage.

5. The machine as described in claim 1 together with a mounting for the light-sensitive film to accommodate a linear translatory movement thereof and mechanism for moving the same through a given range at a progressively accelerated rate in relation to carriage travel and in accordance with a scale of varying depth velocities of recorded vibrations, whereby the images recorded in time interval sequence are transferred to the light-sensitive film on a depth scale sequence.

6. The machine as described in claim 1 together with means for shiftably mounting the light-sensitive film for travel in parallel with said carriage and means for moving the film and the carriage relative to one another and one at an accelerating rate relative to that of the other and in accord with known change in rate of vibration velocity with earth depth increase.

7. The structure of claim 1 and means to impart relative movement between the film and the carriage at a progressively changing rate during carriage travel from one end to the other of its range, said change being predetermined in relation to known earth depth velocities.

8. The structure of claim 1 together with a movable mounting for the film for its movement in a direction parallel with carriage travel, a variable leverage device engageable with the film mounting to control its movement and operatively connected with the carriage for movement with carriage travel, said device having a variable leverage effect controlled by carriage position and predetermined in relation to variations in vibration velocities at increasing depths below the earth surface.

9. The structure of claim 1 and a film container arranged to exclude light but having an open slot aligned with and of a length to pass the light beam from the projector throughout the range of carriage travel, and a mask to overlie said slot in all positions of the carriage and connected for travel with the carriage, said mask having an opening in constant alignment with the projector to pass the light beam directed by the projector to the film.

10. The structure of claim 1 together with means shiftably supporting the record mounting for adjustment along the line of carriage travel for a setting thereof with respect to images projected through said screens and manually controlled means for regulating said adjustment.

11. In a machine of the character described, a holder for a record of earth tremor traces detected in a spread of equal distances on opposite sides from a central shot point, a record scanning device, drive mechanism for the relative parallel travel of the holder and said scanning device, a bank of movably mounted screens having scanning sights therein and being arranged in side by side relationship in two sets with those of one set for alignment with tremor traces on one side of center and those of the other set for alignment with tremor traces on the other side of center, means for effecting unisonal movement of paired screens of said sets, with the pairs comprising each screen successively of spaced from center in one set with the correspondingly center spaced successive screen of the other set, and means responsive to said relative travel to move the pairs of screens differentially in compensation for time lag in the trace record.

12. In a machine of the character described, a holder for a test record of earth tremors in equal time interval spacing, a record scanning device, means to impart travel thereto at a constant rate, a bank of relatively adjustable sights, operating mechanism co-ordinated with the travel rate of said device to adjust and shift said sights relatively and to compel individual shifting thereof during said scanning device travel, a recorder of the images scanned, a movable mounting therefor, and operating mechanism indexed to said scanning device travel to move said recorder at a progressively changing rate predetermined in relation to test depth and resulting in a transposition from an image record in equal time interval spacing of the test record to a reproduced image record in equal depth interval spacing.

13. A machine for reproducing a record in a form corrected for variables encountered in recording the record, a holder for a record to be scanned, a record scanning device, drive connections for imparting relative travel of the scanning device and the record holder parallel with the record presented to the scanning device, a bank of individual record sighting devices mounted for relative adjustment between the scanning device and the record, each for co-operation with a different portion of the record, and indexing mechanism operative to transmit motion to said devices in response to the relative travel imparted by said drive connections and arranged to constrain said relative adjustment to a predetermined time lag pattern.

14. In a machine for reproducing in equal depth increments a seismograph record of an exploratory test recorded in equal time increments, a record holder, a traveling carriage to traverse a record in said holder, a projector on the carriage to progressively scan the record during carriage travel, a recorder co-operating with the projector to receive the record being progressively scanned and reproduce the same, and means moving the traveling carriage and the recorder at differential rates in relation to each other and to said record holder and predetermined to reproduce the test record in depth proportion.

15. In a machine for reproducing a record, a record holder, a traveling light to project light through a record as the light travels across the holder, a support for a light-sensitive film to receive projected light, means to shift said support at a rate different from that of the traveling light projector whereby length increments of the reproduction will differ from length increments of the record traversed, and a light screen mounted for movement with the support and to overlie a portion of the light-sensitive film, said screen having a succession of spaced apart blanks controlling length increment markings on the light-sensitive film by light passage unintercepted by said screen.

16. In a machine for reproducing a record, a record holder, a traveling light to project light through a record as the light travels across the holder, a support for a light-sensitive film to receive projected light, means to shift said support at a rate different from that of the traveling light projector whereby length increments of the reproduction will differ from length increments of the record traversed, a second light source arranged for travel with the first light and directed to the light-sensitive film, a screen fixed in the path of and to be traversed by the second light source, said screen having a series of spaced light passages therein, whose successive spacing is predetermined in relation to the differential movement of said film support, and means for initially adjusting the fixed position of the screen to bring its light passages into a predetermined relation.

17. In a machine for reproducing a record having scale marks along its length, a lengthwise shiftable holder for the record, a traveling scanning device for progressive movement in scanning the record along its length and means to index holder position to correct for inaccurate spacing of successive scale marks in the record at instantaneous scanning points, comprising a fixed screen having a succession of light passages spaced apart distances corresponding to correct spacing of said scale marks so that each passage will be blanked out by a scale mark accurately spaced from a preceding passage, a light source and a photocell mounted on opposite sides of said screen and for travel with said scanning device for alignment through any unblanked passage in the region of instant scanning, and a motor actuator responsive to light reception by said photocell and operative to shift said holder and the scale marks to blank out the light passage to said photocell.

18. A machine for reproducing a seismograph record, including a main frame, a master record holder mounted on said frame, a scanning device movably mounted by said frame to traverse a record in said holder, drive means to impart travel to said scanning device, a recorder co-operating with said scanning device and being movably mounted on said frame and variable speed motion transmitting mechanism connecting said scanning device with said recorder for moving the latter in a progressively changing differential relation with the scanning device.

19. Means to reproduce a seismic trace recorded in increments of time to a reproduction in increments of depth, including a holder for a record showing seismic events in equal time intervals, a scanner to traverse a record in said holder, a recorder of events scanned by said scanner, drive means imparting relative travel between said holder and said scanner and drive means imparting relative travel between said scanner and said recorder at a rate different from the relative travel rate imparted by the first mentioned drive means, the difference in rates being according to a predetermined pattern dictated by known velocity change applicable to the particular record.

20. For reproducing sets of tremor arrival signals contained on a master seismic record of shot induced tremors received sequentially from successively deeper horizons by each of a group of spaced apart detectors and in a reproduced form corrected for tremor travel move-out to spaced apart detector locations, a support for a master seismic record of the tremors as separately received at several detectors, a bank of scanning devices one for each set of signals on the master record, means co-operating with the scanners for reproducing recorded signals being scanned instantaneously by said devices, mechanism imparting relative travel between said bank of scanning devices and the record support for progressively scanning the recorded signals and variable speed power transmission means directly responsive to such relative travel imparted by said mechanism and transmitting the same at variable rates to said devices for shifting them differentially to one another in accord with a predetermined pattern related to detector spacing and elapsed time between signal arrivals from the same horizons.

21. For reproducing sets of tremor arrival signals contained on a master record of shot induced tremors received sequentially from successively deeper horizons by each of a group of spread apart detectors and in a reproduced from corrected for tremor move-out to spaced apart detector locations, a main frame, a holder on the main frame for a master record of the tremor as separately received at the several detectors, a traveling carriage guided on the main frame for movement in a linear path along and parallel to said holder, a bank of scanning devices separately and relatively movably mounted on said traveling carriage and carried thereby in operative relation with a record mounted in said holder, there being one scanning device for each set of signals on the master record, means co-operating with the scanners for reproducing recorded signals being scanned instantaneously by said devices, power drive means imparting linear travel to said carriage for effecting a progressive scanning of recorded signals as the scanning devices travel with the carriage, and variable leverage linkage connections with the frame and with the traveling carriage for operation in response to carriage travel on the frame and operatively connected with the respective scanning devices to impart thereto a relative differential linear movement in accord with a predetermined pattern related to relative detector locations for the master record being scanned.

References Cited in the file of this patent

UNITED STATES PATENTS

| | | |
|---|---|---|
| 2,424,218 | Begun | July 22, 1947 |
| 2,424,622 | McClure | July 29, 1947 |
| 2,427,421 | Rieber | Sept. 16, 1947 |
| 2,463,534 | Hawkins | Mar. 8, 1949 |
| 2,496,648 | Wolf | Feb. 7, 1950 |
| 2,535,348 | Caan | Dec. 26, 1950 |
| 2,539,220 | Athy et al. | Jan. 23, 1951 |
| 2,638,402 | Lee | May 12, 1953 |
| 2,732,025 | Lee | Jan. 24, 1956 |